(No Model.)
S. SPITZER.
PLANT FOR THE MANUFACTURE OF STARCH FROM GRAIN.
No. 386,363. Patented July 17, 1888.
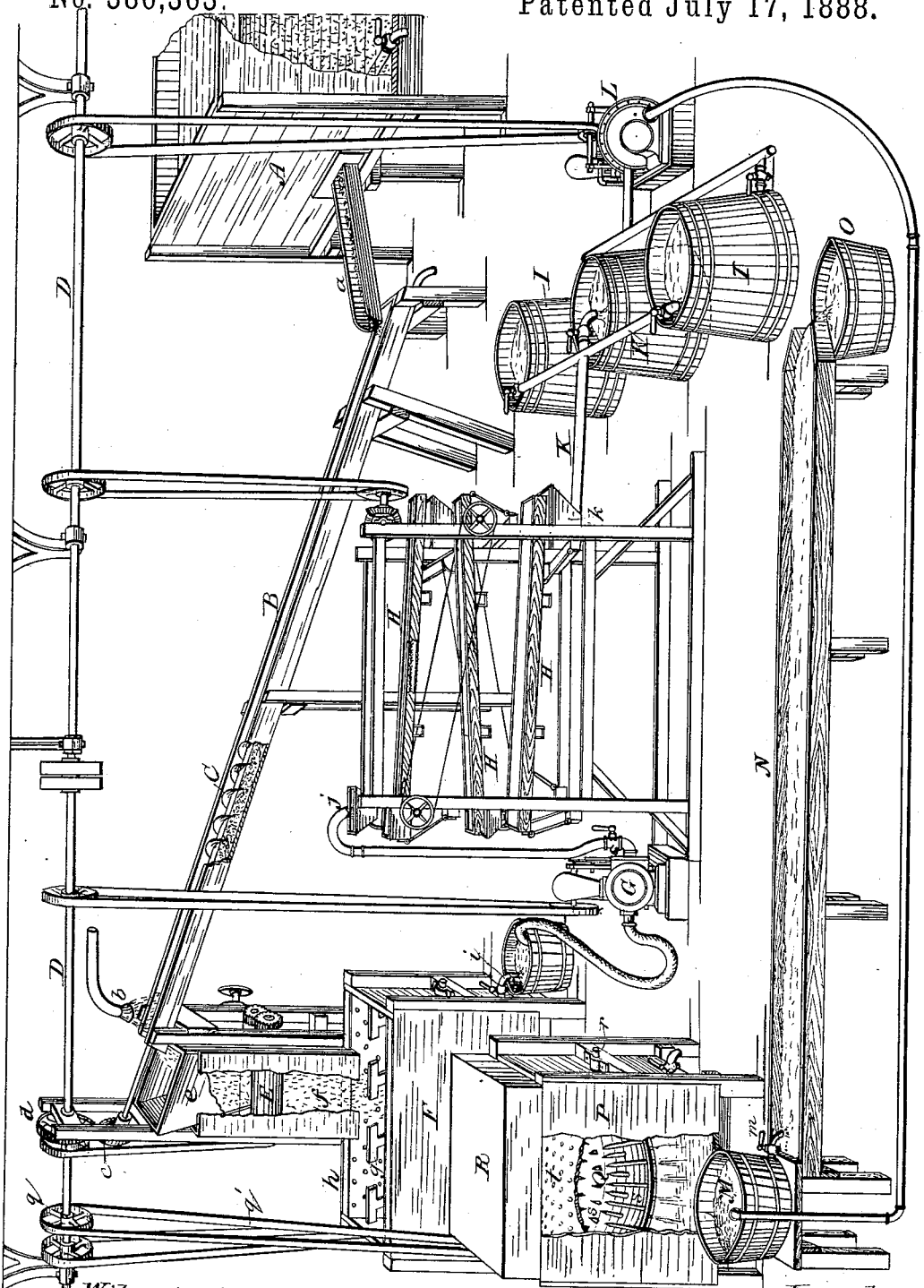
Witnesses:
Inventor:
Sigmund Spitzer,
By T. C. Brecht,
Attorney.

UNITED STATES PATENT OFFICE.

SIGMUND SPITZER, OF NEW YORK, N. Y., ASSIGNOR TO THE VIENNA WHEAT STARCH COMPANY OF WEST VIRGINIA.

PLANT FOR THE MANUFACTURE OF STARCH FROM GRAIN.

SPECIFICATION forming part of Letters Patent No. 386,363, dated July 17, 1888.

Application filed February 20, 1888. Serial No. 264,671. (No model.)

*To all whom it may concern:*

Be it known that I, SIGMUND SPITZER, of New York city, in the county of New York and State of New York, have invented certain Improvements in Plants for the Manufacture of Starch, &c., from Grain, of which the following is a specification.

My invention relates to improvements in that class of plants consisting of a series of apparatus employed for the manufacture of starch, in which the starch is separated from the pasty substances produced during the manufacture of said starch; and the object is to produce starch of a superior and perfectly white and pure kind; also, to entirely dispense with the use of chemicals of any kind in the manufacture of starch and employ only perfectly pure water, and, finally, to produce the starch in a far more economical and thorough manner than it has been possible to do heretofore.

The invention to this end consists of a plant in which apparatus are used by which the starch is manufactured so as to be perfectly pure and white, separated from all bran, refuse, &c., as will be more fully described hereinafter, and specifically pointed out in the claim, reference being had to the accompanying drawing and the letters of reference marked thereon.

The accompanying drawing represents a perspective view of the various apparatus employed in succession for the manufacture of starch, &c., from grain.

In the drawing, A represents a receptacle of any suitable size and material, in which the grain is softened and passed through a spout, $a$, into a trough, B, arranged in an inclined manner and containing a conveyer, C, operated by suitable gearing, $c\ d$, from the shafting D. The conveyer carries the softened grain to the hopper $e$ of the crushing-rollers E, also operated by pulleys and belt from the shaft D. It then passes through a spout, $f$, into the apparatus F, containing a shaft provided with a series of beaters or mixers, $g$, placed spirally around the shaft. A lining with perforations $h$ is placed in the casing of said apparatus, and the material, with a proper quantity of pure water, supplied in sufficient quantity to form a paste, passes from the rollers E into said lining, and the purified material is forced through the perforations $h$ into the space between the lining and casing. It then passes through a faucet or cock, $i$, into a tub or vat, from which it is pumped by a pump, G, and forced through a pipe or hose into the hopper $j$ of a series of sieves, H, arranged in reversed directions, and passes from one to the other. These sieves receive a shaking motion by means of a series of gearing, pulleys, and belts, and the starch passes through the meshes of gradually-finer mesh or size until it arrives at the hopper $k$, from which it passes through pipes K, provided with suitable valves or cocks, into the vats I, of proper size. The sieves H are supported in a suitable frame-work and are suspended by suitable pivoted links or rods. The bran, refuse, &c., are carried on the top of the sieves until they arrive at their lower ends, from which they are conveyed to any desired place or receptacle. The greatly-purified starch will settle in the bottom of the vats I, from which it is drawn by a suitable double-acting pump, L, and pipes provided with proper valves or cocks and conveyed by a pipe or hose into a vat or other receptacle, M. From this vat it passes into a trough, N, through the faucet or valve $m$, and finally reaches the receiving or refining vat O in a thoroughly-purified and white state, and is then dried and ready for the market.

If desired, a stream of water may be led into the upper end of the conveyer-trough B, by which any dust, &c., on the grain may be washed off through the pipe and rose-jet $b$, connected to any suitable source of supply. The gummy or glutinous substances, as well as the refuse, &c., are then conveyed to the machine or apparatus P, consisting of a barrel-shaped elliptical or cylindrical drum or vessel, Q, placed in a suitable casing and revolved by suitable belt and pulley, $q$. The drum Q is provided with stud-shafts $r$, upon one of which is placed the pulley connected to the pulley $q$ by the belt $q'$, and has numerous inwardly-projecting pins or cutters $s$, which tear and separate the material or lumps introduced into the drum, and thus the bran, &c., is separated and forced through numerous perforations $t$ in said drum, while the gummy substances are retained in the vessel, and out of this the glue, sizing, &c., are produced. A cover, E, which is hinged or made removable, prevents the water being plashed about in the building.

I have shown and described a machine for the manufacture of glue from the refuse in this plant, but do not claim such, as this is patented to me in No. 361,788, April 26, 1887. It is obvious that any other machine could be utilized for this purpose.

It will be readily understood by those skilled in the art that the various parts of the apparatus can be varied in size or position; but I have found the arrangement shown to be the most convenient and best adapted for the purpose of manufacturing starch, &c. More or less vats or sieves may be employed as required, and the vats may be made square or of other shape, as desired, and the gearing or pulleys may be changed to suit different localities. It will be also readily observed that with each successive apparatus employed in this operation the starch will become whiter and more purified of any gummy substances or refuse, &c., by the constant application of pure water and without the use of chemicals of any kind whatever.

I am aware of the Patents No. 17,710, to Watt; No. 278,490, to Best; No. 362,502, to Graves, and English Patents No. 668 of 1854 and No. 1,325 of 1858, and disclaim the construction shown therein; but,

Having thus described my invention, what I claim, and desire to secure by Letters Patent, is—

The plant for the manufacture of starch herein described, consisting of the saturating-receptacle A for the grain, the trough B, the conveyer therein, the crushing-rolls E, the separating apparatus F, having beaters $g$, the pump G, and series of sieves H, with the pipes K and settling-vats I, the force-pump L, the vat M, and trough N, all arranged in the manner and for the purpose herein shown and specified.

In testimony whereof I hereunto set my hand in the presence of two attesting witnesses.

SIGMUND SPITZER.

Witnesses:
OCTAVIUS KNIGHT,
T. C. BESCHT.